United States Patent
Dannowski

(10) Patent No.: US 9,940,148 B1
(45) Date of Patent: Apr. 10, 2018

(54) IN-PLACE HYPERVISOR UPDATES

(71) Applicant: Amazon Technologies, Inc., Reno, NV (US)

(72) Inventor: Uwe Dannowski, Moritzburg (DE)

(73) Assignee: Amazon Technologies, Inc., Seattle, WA (US)

( * ) Notice: Subject to any disclaimer, the term of this patent is extended or adjusted under 35 U.S.C. 154(b) by 459 days.

(21) Appl. No.: 13/959,608

(22) Filed: Aug. 5, 2013

(51) Int. Cl.
G06F 9/455 (2006.01)
G06F 9/445 (2018.01)

(52) U.S. Cl.
CPC ............ G06F 9/45533 (2013.01); G06F 8/67 (2013.01)

(58) Field of Classification Search
CPC ............ G06F 9/45558; G06F 9/45545; G06F 9/45533; G06F 8/65; G06F 8/67
USPC .......................................................... 718/1
See application file for complete search history.

(56) References Cited

U.S. PATENT DOCUMENTS

| | | | | |
|---|---|---|---|---|
| 6,070,012 A * | 5/2000 | Eitner | ......................... | G06F 8/67 709/221 |
| 7,814,495 B1 * | 10/2010 | Lim | ..................... | G06F 9/45558 717/168 |
| 8,316,374 B2 * | 11/2012 | Lim | ..................... | G06F 9/45558 714/15 |
| 9,292,332 B1 * | 3/2016 | Liguori | ....................... | G06F 8/65 |
| 2006/0143600 A1 * | 6/2006 | Cottrell | .................. | G06F 21/572 717/168 |
| 2010/0199272 A1 * | 8/2010 | Mahajan | .................... | G06F 8/67 717/171 |
| 2011/0066786 A1 * | 3/2011 | Colbert | ............... | G06F 9/45558 711/6 |
| 2012/0017031 A1 * | 1/2012 | Mashtizadeh | ........ | G06F 9/45558 711/6 |
| 2012/0192182 A1 * | 7/2012 | Hayward | ................ | G06F 9/455 718/1 |
| 2012/0254865 A1 * | 10/2012 | Saeki | ................... | G06F 9/45533 718/1 |
| 2012/0266169 A1 * | 10/2012 | Lagergren | ............. | G06F 9/4401 718/1 |
| 2013/0227551 A1 * | 8/2013 | Tsirkin | ................ | G06F 9/45558 718/1 |
| 2014/0101657 A1 * | 4/2014 | Bacher | ................ | G06F 9/45558 718/1 |

OTHER PUBLICATIONS

Meng et al. "Live-upgrading Hypervisors: A Study in Its Applications" Published: 2008 IPSJ SIG Technical Report, pp. 17-23.*

* cited by examiner

*Primary Examiner* — Meng Ai T An
*Assistant Examiner* — Willy W Huaracha
(74) *Attorney, Agent, or Firm* — Davis Wright Tremaine LLP

(57) ABSTRACT

Techniques for in-place updates of hypervisors are described herein. At a time after receiving an update hypervisor request, one or more controlling domains within a computing system invoke one or more system capabilities at least to pause execution of currently running client domains and non-essential CPUs. While the client domains and non-essential CPUs are paused, a new hypervisor in instantiated, state information is copied from the existing hypervisor to the new hypervisor. After the state and/or configuration copy is complete, control is switched form the existing hypervisor to the new hypervisor and client domains and non-essential CPUs are resumed.

22 Claims, 9 Drawing Sheets

IN-PLACE HYPERVISOR UPDATES

BACKGROUND

Modern computing systems place high importance on system reliability, security, stability and availability. In many computing systems, and especially those involving virtualized computing environments wherein a large plurality of guest operating systems may use shared computer resources, system outages caused by updates to the host system can cause system outages on the guest operating systems. Such outages can adversely affect computing resource operators and the customers reliant on the virtualized operating systems. Because, in many implementations, a single host system supports multiple guest operating systems, and because a single computing environment may have many host systems, a service disruption to the host systems can adversely affect an unpredictably large number of guest systems. Additionally, as system complexity increases over time, so too does the need for more frequent reliability, security and stability updates to the computing resources, leading to ever increasing outages and a significantly impaired customer experience.

BRIEF DESCRIPTION OF THE DRAWINGS

Various embodiments in accordance with the present disclosure will be described with reference to the drawings, in which.

DETAILED DESCRIPTION

Figure 1:
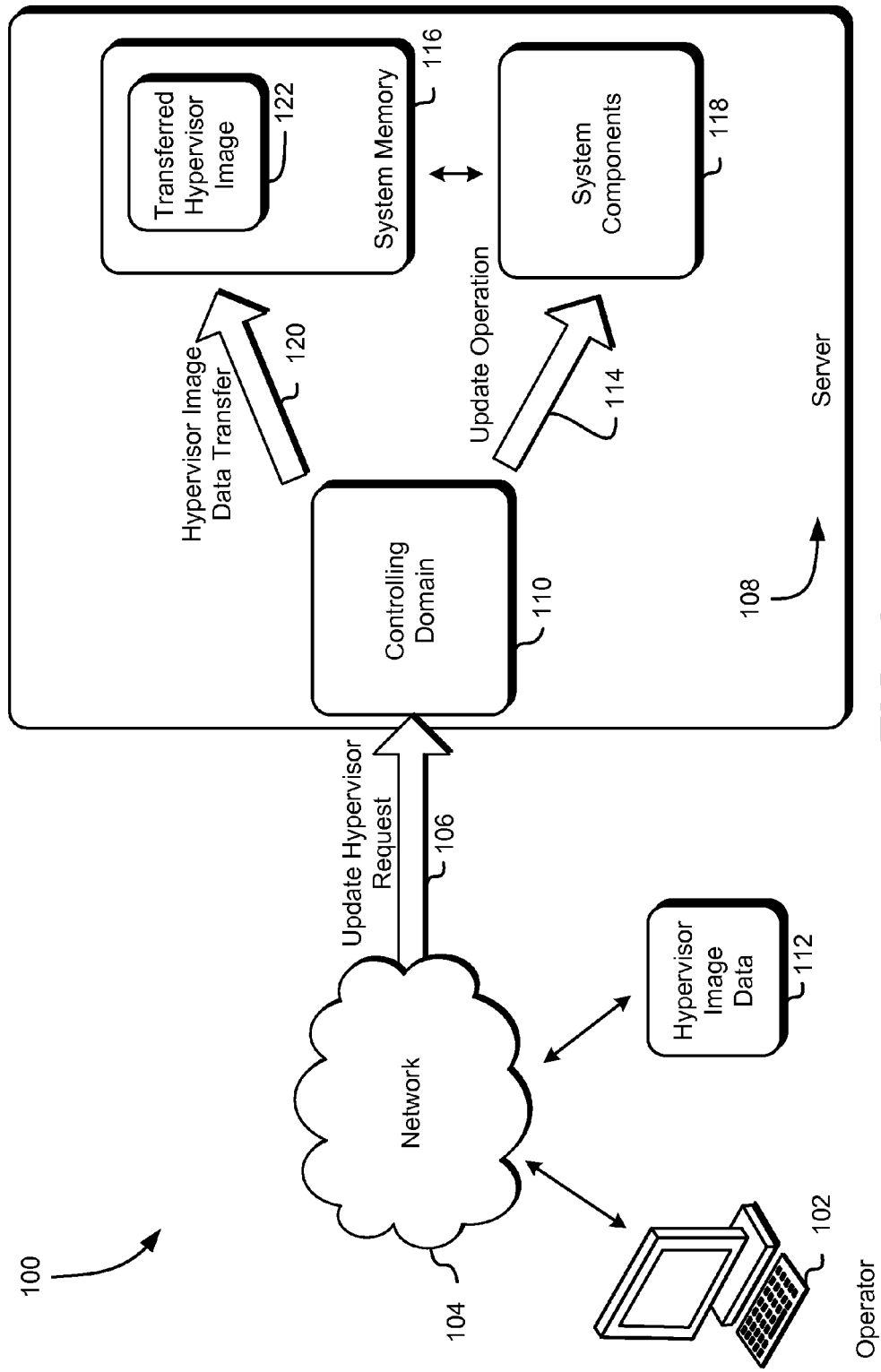
FIG. 1 illustrates an example environment in which servers and other computing resources may be updated in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for updating systems and executable code operating thereon. In particular, techniques are disclosed for utilizing processor capabilities to facilitate updates of operational elements of software platforms, including, but not limited to, operating systems and hypervisors, while these operational elements are being shared with a plurality of guest entities thereon, with minimal operational interruption to the guest entities. In such a virtualization scheme, a hypervisor may provide a service abstraction layer for one or more guest computer systems (also referred to as "virtual machines"). A server upon which a virtualization scheme is implemented may benefit from updates to the hypervisor software or hypervisor configuration while running, whether these updates include security patches, system updates, system rollbacks, interface changes, and/or a combination of these and other software and/or configuration changes. A server upon which a virtualization scheme is implemented may also be one of a plurality of servers hosting a plurality of virtual machines. In such a virtualization scheme, live migration of a virtual machine from one server to another may be utilized to facilitate system efficiency and availability. However, live migration may be infeasible for busy guest virtual machines and/or guest virtual machines that use large amounts of system resources such as, but not limited to, memory, storage, network bandwidth, processors, graphics processors, and/or combinations of these and other resources. Generally, updating the hypervisor while guest computer systems are active can be challenging and disruptive, usually requiring terminating all of the guest computer systems, an update, and then a restart or reboot of the guest computer systems.

In many conventional systems, in which updates to the hypervisor require that the guest computer systems are rebooted, the guest computer systems must either be brought to a halt before termination or there will be a disruptive loss of work. Bringing guest computer systems to a halt may also disrupt processing of client requests and may lead to an adverse impact on client interaction with the computer service provider's systems. This adverse impact may be even more pronounced in computer systems where a large number of hypervisors require an update. Example systems include systems of computing resource service providers which may, for instance, host virtual computer systems on behalf of customers who remotely manage the virtual computer systems. In such systems, rebooting guest computer systems can bring certain operations reliant on the guest computer systems to a standstill, perhaps resulting in data loss and/or, generally, disruptions in service. By contrast, a system where the hypervisor can be updated without terminating and rebooting the guest computer systems may provide significantly less disruption to the guest computer systems. In such a system, guest computer systems may be paused briefly while the new hypervisor is instantiated in a state where it can seamlessly provide the service abstraction layer for the guest computer systems, and then the guest computer systems are resumed, with little impact on their operation and with no reboot. This seamless transition from the first to the second hypervisor has little impact on the guest computer systems and a correspondingly small impact on the client interaction with the computer service provider's systems.

Updates to the running hypervisor may be facilitated by an in-place hypervisor update, such as by instantiating a second, updated copy of the hypervisor running on the same machine as the current (running or active) hypervisor, which has been patched with the updated capabilities. The updated hypervisor may be acquired from an outside server, data store, or remote network location. The updated hypervisor may, in some embodiments, be verified for integrity and authenticated using various methods, such as by calculating a digital signature or checksum of the hypervisor and comparing it to a known value. When the second hypervisor has been verified and has been instantiated, each of the guest computer systems may then be paused, halting, but not terminating their execution. Once all of the guest computer systems are paused, the second hypervisor may then request state and configuration data about the guest computer systems from the first hypervisor. In some embodiments, the state and configuration data may be transformed by the new hypervisor into a form usable by the second hypervisor.

In some other embodiments, the new hypervisor may request and use an exact copy of the state and configuration data from the current hypervisor. The new hypervisor may also instruct the current hypervisor to copy the state and configuration data to a shared or known data location, either with or without alterations to the data, and either on the same or on a different computer system as described herein, then the new hypervisor may copy the state and configuration data from that shared or known data location, again either with or without alterations to the data. In some embodiments, the state and configuration data may be copied into a canonical form, which is a data structure form that is agreed-to and shared by the current and the second hypervisor.

When the state and configuration data have been copied as described, the new hypervisor may then match, as closely as possible, the state of the current hypervisor by using the state and configuration data from the current hypervisor. It may not be necessary that the state of the new hypervisor be identical to the state of the current hypervisor in order for the states to match. Two hypervisors may be in a matching state when the second hypervisor can provide the same set of services to the one or more guest computer systems as were provided by the first hypervisor, before the one or more guest computer systems were paused. When the second hypervisor has the system state and data, the first hypervisor may be paused and the second hypervisor may be started. In some embodiments, system processes are paused or suspended using various methods, such as using a system console, through hypervisor control, through host operating system control or through dedicated system hardware or firmware, before starting or stopping hypervisors. When the second hypervisor is running, the guest computer systems may now be resumed, operating as before, but with their service abstraction layer provided by the second hypervisor.

When the guest computer systems are resumed, their physical memory (or memory space) and state information are unchanged, remaining the same as when they were paused, but now operating under control of the second hypervisor. In some embodiments, suspended system processes are resumed before restarting the guest computer systems. The first hypervisor may then be stopped and removed from the system. Various operations associated with the hypervisor update, such as the storage of the updated hypervisor image or the translation of the state and configuration data, in some embodiments, take advantage of shared or hardware restricted memory or system components. The entire update process may be orchestrated by disparate processes and/or components and may utilize defined and dedicated components such as specific interfaces, specific terminals, restricted networks, system hardware, system software and/or a combination of these or other processes and/or components.

FIG. 1 illustrates an environment 100 for updating systems, such as servers, as well as the associated code running thereon in accordance with at least one embodiment. One or more operators 102 connect to one or more servers 108 using one or more networks 104 and/or entities associated therewith, such as other servers also connected to the network, either directly or indirectly. In some embodiments, the operator may receive privilege to perform the operations, for example, by virtue of location within a data center, or by attachment to a dedicated network, or by the establishment of recognized credentials, and/or the like. The network may, for example, be a local network, an internal network, a public network such as the Internet, a wide-area network, a wireless network, a mobile network, a distributed computing system with a plurality of network nodes and/or the like. The aforementioned entities may include any device that is capable of connecting with the servers via a network, including at least servers, laptops, mobile devices such as smartphones or tablets, distributed computing systems and components thereof, abstracted components such as guest computer systems or virtual machine instances, and/or other types of computing devices and/or components. The server may, for example, be hardware, a virtual machine, a distributed system, and/or the like.

In some embodiments, the operator 102 may send an update hypervisor request 106 to controlling domain 110 running on server 108 through network 104. The controlling domain may, for example, be a dedicated process that runs on the server 108, a component of the server operating system, a dedicated network interface, an executable program and/or the like. The update hypervisor request 106 may be received by the controlling domain in various ways in accordance with various embodiments. For example, in some embodiments, the controlling domain 110 is configured to receive the hypervisor update request 106 and locate the hypervisor image data 112 from information included therein. The image data information may, for example, include a copy of the hypervisor image, a network location of the hypervisor image, a description of the hypervisor image, a reference to a separate entity that provides hypervisor images, and/or the like. In some embodiments, the hypervisor update request 106 may include a reference to a hypervisor image data 112 located somewhere on the network 104. The image may be located on the same or on a different entity requesting the application thereof. It should be noted that other ways of delivering the hypervisor image data 112 to the controlling domain 110 are also considered as being within the scope of the present disclosure. For an illustrative example, the source of the hypervisor image data may not be a separate location, but instead may be a peer-to-peer network, where each one of a group of servers, including server 108, is configured to both send and receive bits of the hypervisor image data to other peer servers.

In some embodiments, after the hypervisor image data 112 is received by the controlling domain 110, the data is transferred using a hypervisor image data transfer 120 to a transferred hypervisor image 122 stored in system memory 116 in preparation for the updating operation 106, illustrated below. The hypervisor image data transfer 120 may include validation, decompression, translation, aggregation of additional components, and/or other computer operations to prepare the hypervisor image data for execution as defined by the update process. For example, the hypervisor image data 112 may be compressed, requiring decompression to produce the transferred hypervisor image 122. In some embodiments, the hypervisor image data 112 may need to be verified for valid data, for valid security credentials, for valid origin, and/or other such verification requirements before a transferred hypervisor image 122 can be created. In some embodiments, the verification may be accomplished using a digital signature consisting of a cryptographically strong private cryptographic key and a root public key that is/was stored in the controlling domain 110 or sent by the operator 102 as part of the update hypervisor request 106. In some embodiments, the transferred hypervisor image 122 may need an additional verification after creation for valid security credentials, valid format, and/or other such verification requirements before the transferred hypervisor image 122 can be executed. The system memory 116 may, for example, include dedicated memory, general memory, virtual memory, a network drive, external storage, an attached device, and/or the like, provided such memory is accessible to the controlling domain and to other system components. In some embodiments, the controlling domain may store a single image in the system memory 116 at a time. In alternate embodiments, the controlling domain may store a plurality of images in the system memory 116, using a storage maintenance method such as, but not limited to, compression, archiving, deletion, and/or any combination of such storage methods.

Returning to the embodiment illustrated in FIG. 1, once the controlling domain 110 has a transferred hypervisor image 122 stored in system memory 116, a request to update hypervisor 106 may be sent by one or more operators 102 to controlling domain 110 on one or more servers 108 over one or more networks 104 and/or entities associated therewith, such as other servers also connected to the network, either directly or indirectly. The request to update hypervisor 106 may be received and processed by the controlling domain 110 in various ways in accordance with various embodiments. In some embodiments, the request to update hypervisor may come as a separate command from the operator. In alternate embodiments, the request to update hypervisor may be automatically triggered by the existence of a new valid transferred hypervisor image.

As illustrated in FIG. 1, once the controlling domain 110 receives the request to update hypervisor 106 it locates the correct transferred hypervisor image 122. The correct transferred hypervisor image may be located by methods including, but not limited to, dedicated locations, identification in the request to update hypervisor, by date and time, by an indexing scheme, and/or any combination of such location methods. The controlling domain may validate the transferred hypervisor image for data integrity, security, policy enforcement and/or any combination of such validation methods. In some embodiments, the controlling domain 110 will then initiate the update operations 114 to one or more system components 118. The system components may include, in some embodiments, one or more running hypervisors, one or more guest computer systems, system processes, system memory, system processors, external resources, and/or any combination of such components. Update operations include, for example, stopping and starting processes, stopping and starting hypervisors, creating and destroying hypervisors, allocating memory, initiating commands in other components, pausing and resuming system processors, transferring data from other components, receiving responses from other components, verifying and validating data, and/or other such operations. In some embodiments, the controlling domain will perform the update operations itself, communicating with existing system components. For example, the controlling domain may itself implement the creation of a new hypervisor by directly creating the process in available memory. Alternatively or in addition, the controlling domain will direct other components to perform update operations. For example, the controlling domain may request that a hypervisor manager create a new hypervisor in available memory according to data stored in the transferred hypervisor image.

In some embodiments, the update operations together may include creating a new hypervisor from the transferred image, pausing of all guest computer systems of the existing hypervisor, transferring guest computer systems from the existing hypervisor to the new hypervisor, resuming all guest computer systems, and/or a combination of one or more of these and other utility operations mentioned herein. The update operations may include final clean-up of the system state if the update processes were successful and/or reverting to a previous known good state in the event of an error in the update process. Upon successful completion of the update operations, the updated hypervisor will be running without any disruptive downtime to the hypervisor or to the guest computer systems and the guest computer systems will resume with physical memory and state information unchanged from when they were paused. The ability to update hypervisors without stopping or evicting guest computer systems achieves numerous technological advantages including, but not limited to, maintaining high system availability, ensuring that security and functional patches may be rapidly applied in a timely manner, ensuring no interruption to critical operations and computations and ensuring minimal disruption to system operations.

Figure 2:
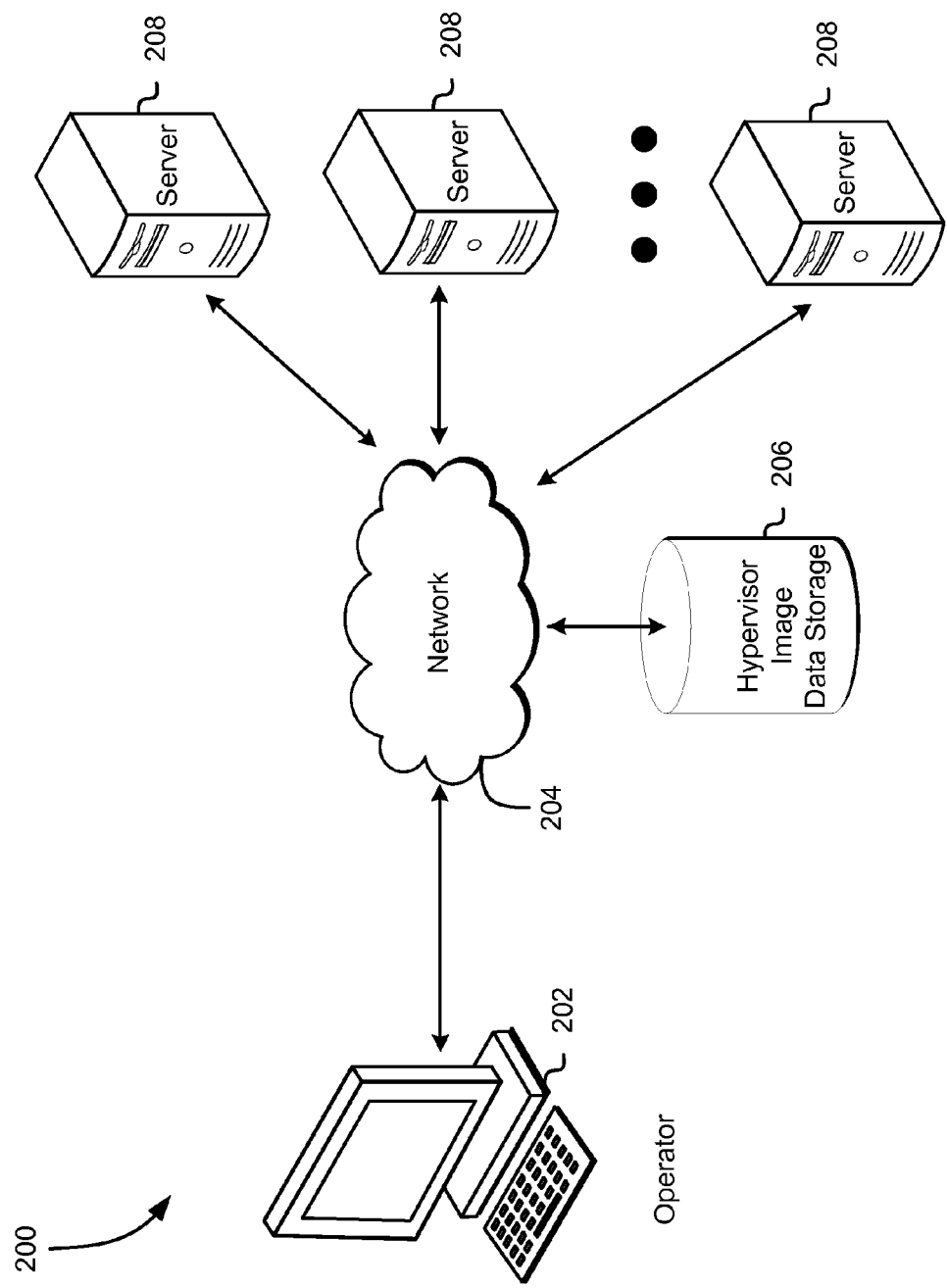
FIG. 2 illustrates an example environment in which a plurality of servers and other computing environments can be updated with at least one embodiment.

As previously mentioned, the server 102 from FIG. 1 may be among a plurality of servers interconnected in a distributed computing system and/or datacenter. FIG. 2 illustrates a distributed computing environment and/or datacenter environment 200 in which various embodiments may be exercised. One or more operators 202 connect to one or more servers 208 using one or more networks 204 and/or entities associated therewith, such as other servers also connected to the network, either directly or indirectly. In some embodiments, the operator may receive privilege to perform the operations, for example, by virtue of location within a data center, or by attachment to a dedicated network, or by the establishment of recognized credentials, and/or the like. The network may, for example, be a local network, an internal network, a public network such as the Internet, a wide-area network, a wireless network, a mobile network, a distributed computing system with a plurality of network nodes and/or the like. The aforementioned entities may include any device that is capable of connecting with the servers via a network, including at least servers, laptops, mobile devices such as smartphones or tablets, distributed computing systems and components thereof, abstracted components such as guest computer systems or virtual machine instances, and/or other types of computing devices and/or components. The server may, for example, be hardware, a virtual machine, a distributed system, and/or the like. Each server may contain at least one hypervisor, at least one controlling domain, and at least one virtual machine slot capable of running a guest operating system such that the hardware of a given server is abstracted among the guest operating system instances. In such a distributed computing environment and/or datacenter environment, it may be contemplated that a large number of servers and a correspondingly larger number of guest computer systems may be simultaneously adversely affected by the necessity for an update to the hypervisor.

Thus the techniques described at least in connection with FIGS. 1-2 may be scaled and/or adapted to provide minimally disruptive updates to hypervisors associated with and/or dependent on a distributed system and/or datacenter environment. For example, each server may have one or more controlling domains associated with one or more hypervisors. The update hypervisor request may be invoked on each controlling domain on a server or on a subset of those controlling domains as determined by the operator. At least one copy of the hypervisor image data would be sent to each server that may be updated. As may be contemplated, hypervisor image data and/or hypervisor images may be shared within a server using a hypervisor image data storage system 206, between servers or not at all as allowed by the operator and/or the distributed system and/or datacenter architecture. The request to update hypervisor may then be invoked on each controlling domain on a server, for each hypervisor associated with that controlling domain or on a subset of those hypervisors as determined by the operator. The plurality of the requests to update hypervisor may then be performed, either sequentially or all at once, as determined by system resources and/or by the operator. The examples given are not exhaustive; due to the minimally disruptive nature of the update mechanisms described herein, any controlling domain of the distributed system and/or datacenter's servers may receive update hypervisor requests for any of its associated hypervisors, using the described techniques without adversely affecting the operation of the guest computer systems or altering their physical memory or state.

Figure 3:
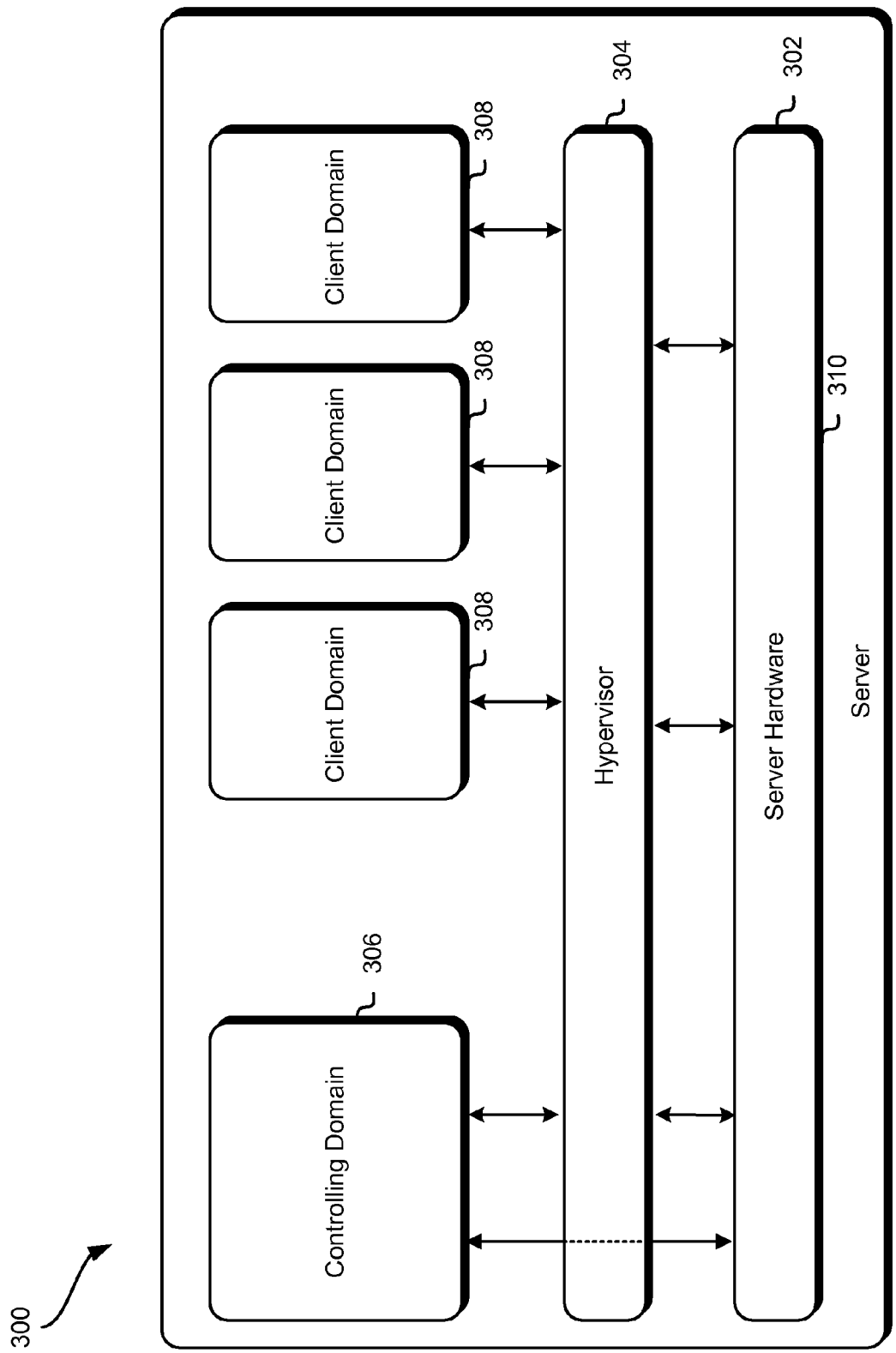
FIG. 3 illustrates an example hardware virtualization environment in which system components may be updated in accordance with at least one embodiment.

As previously mentioned, server hardware may be abstracted using a variety of virtualization techniques to operate a plurality of guest computer systems running virtual operating system instances simultaneously. FIG. 3 illustrates an environment 300 using one such technique. The server 310 is, in some embodiments, similar to the server 108 described in connection with FIG. 1 and to the server 208 described in connection with FIG. 2. In some embodiments, the server hardware 302 of the server may interface with a virtual machine monitor (VMM) or hypervisor 304 running directly on the hardware as a native hypervisor. This Type 1, native or bare metal hypervisor runs directly on the server hardware. Examples of Type 1 hypervisors include Xen®, Hyper-V®, various products from VMWare® and others. In other embodiments, the server hardware may interface with a VMM or hypervisor that runs as a client of the host operating system (OS). Examples of Type 2, or hosted, hypervisors include VMWare® Workstation, VirtualBox® and others. Bare metal hypervisors typically run at the highest privileged processor state and hosted hypervisors typically run at the highest privileged user processor state in order to efficiently provide memory management services, access to system resources, and processor scheduling for dependent domains. Of the dependent domains, the most privileged is the controlling domain 306, which may run processes that implement administration operations for controlling and configuring the hypervisor. The controlling domain also may run processes that implement administration operations for controlling and configuring the lesser domains, including the client domains 308 that may, in some embodiments, host guest operating systems. The controlling domain may have direct access to the hardware resources of the server hardware and the controlling domain may provide that access to client domains. In some embodiments, a client domain may have no direct access to the hardware resources or direct access to some hardware resources of the server hardware including, but not limited to, Graphics Processing Units (GPUs) and Network Interface Cards (NICs). Generally, client domains may be provided less direct hardware access than controlling domains.

A controlling domain may process an update hypervisor request as described in connection with FIG. 1, without disruption to the hypervisor, and thus without disruption to the controlling domain or to the guest domains. The update hypervisor request may require access to system resources such as the Internet to receive the image, utilities to transfer the image, and system memory to store the image, while not requiring the ability to pause or stop the existing hypervisor, or to pause or stop the guest domains. A controlling domain may process a request to update hypervisor as described in connection with FIG. 1 with only minimal disruption to the hypervisor, and thus with only minimal disruption to the controlling domain or to the guest domains. The controlling domain may instantiate the new hypervisor from the hypervisor image, pause all of the guest domains, copy the state from the previous hypervisor to the new hypervisor, stop the old hypervisor, start the new hypervisor and restart all of the guest domains as described in connection with FIG. 1. As may be contemplated, the necessity of interrupting execution of the guest domains running on a given server may, in some embodiments, depend on the type of virtualization used.

Figure 4:
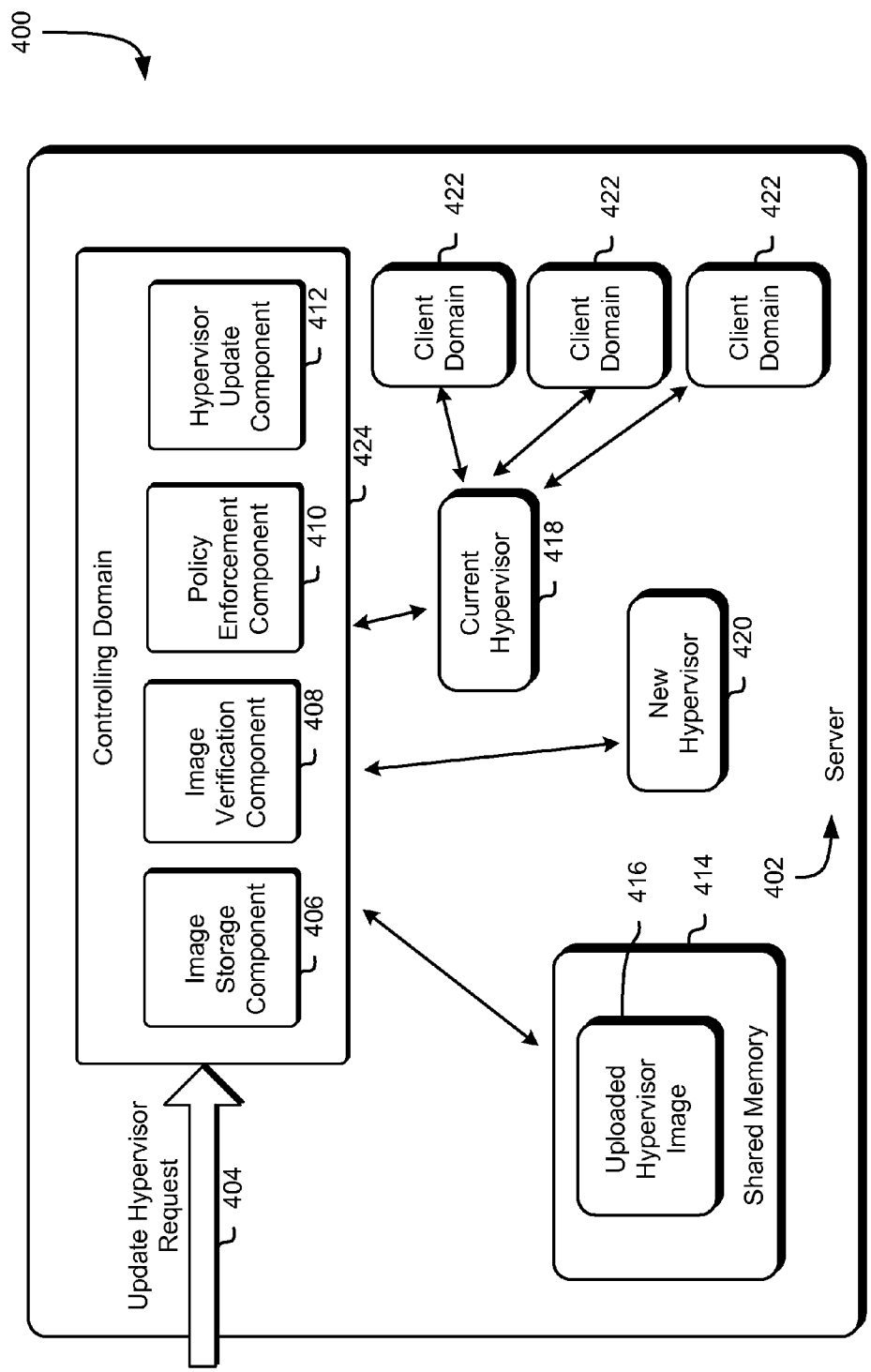
FIG. 4 illustrates an example hardware virtualization environment combined with an example environment in which servers and other computing resources may be updating in accordance with at least one embodiment.

FIG. 4 illustrates an environment 400 showing one example technique for updating computer systems as described at least in conjunction with FIG. 1 combined with one example virtualization technique for operating a plurality of operating systems as described at least in conjunction with FIG. 3. In some embodiments, the controlling domain 424 on server 402 receives the update hypervisor request 404. The current hypervisor 418, running on the server, may control one or more client domains 422. The controlling domain 424 is, in some embodiments, similar to the controlling domain 110 as described in conjunction with FIG. 1 and controlling domain 306 as described in conjunction with FIG. 3. The update hypervisor request is, in some embodiments, similar to the update hypervisor request 106 as described in conjunction with FIG. 1. In some embodiments, the controlling domain 424 may receive and process the update hypervisor request using a variety of processing components which are processes that are executed in the controlling domain and which may include internal components, host system components, external components and/or a combination of these and other processing components. The controlling domain 424 may include an image storage component 406, which is a processing component dedicated to receiving and storing the incoming hypervisor image data. The image storage component may, in some embodiments, receive the incoming hypervisor data and store the uploaded hypervisor image 416 in shared memory 414 so that the image is accessible by other components and/or other parts of the server.

The controlling domain may, in some embodiments, include an image verification component 408, which is a processing component dedicated to verifying the correctness, integrity, authority and/or other verification qualities of the uploaded hypervisor image data. The image verification component may, in some embodiments, verify the uploaded hypervisor image against a variety of standards and using a variety of techniques, including, but not limited to, memory checksums, key verification, command authorization, and/or some combination of these and other standards and techniques. The controlling domain may, in some embodiments, include a policy enforcement component 410, which is a processing component dedicated to enforcing system policies for performing hypervisor updates. The policy enforcement component may, in some embodiments, examine the update hypervisor request and verify that the update conforms to established policy. The controlling domain may, in some embodiments, include a hypervisor update component 412, which is a processing component dedicated to performing the update steps. The hypervisor update component is responsible for ensuring client domains are paused and restarted, ensuring system processors are paused and restarted, creating and destroying hypervisors 418 and 420, starting, stopping, and pausing hypervisors 418 and 420 and/or a combination of these and other techniques. The controlling domain may, in some embodiments, include a combination of an image storage component, an image verification component, a policy enforcement component, a hypervisor update component, and/or a combination of these and/or other processing components.

Figure 5:
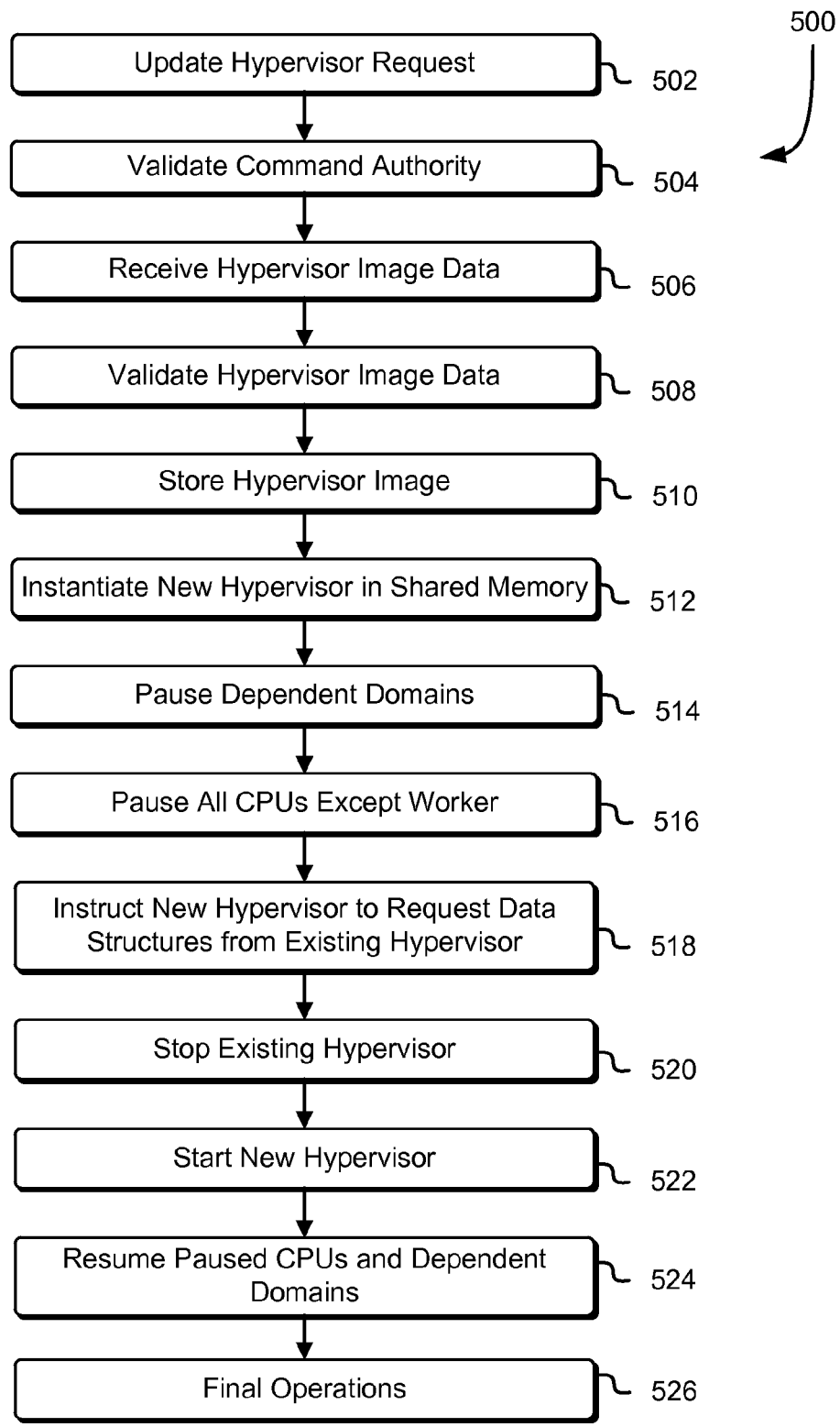
FIG. 5 illustrates an example process for updating computing resources using processor-supported capabilities in accordance with at least one embodiment.

FIG. 5 illustrates an example process 500 for updating code running on a system, server, and/or abstraction thereof in accordance with at least one embodiment. In some embodiments, one or more components of server 108 as described in connection with FIG. 1 and/or server 208 as connected with a distributed computing system and/or datacenter as described in connection with FIG. 2 may perform process 500.

An entity associated with targeted systems, servers, and/or abstractions thereof receives an update hypervisor request 502 to update the hypervisor currently running thereon. The request 502 may be received by a receiving entity which is, for example, a process running on the controlling domain as described at least in connection with FIGS. 1 and 4, from a requesting entity which is, for example, an operator as described at least in connection with FIG. 1, over a network using techniques also described at least in connection with FIG. 1. In some embodiments, the receiving entity may validate the authority of the issuing entity to perform such an update 504 using techniques described in connection with FIG. 1. The receiving entity may then process the request to locate the new hypervisor image data 506 using methods such as described in connection with FIG. 1. In some embodiments, for example, the receiving entity may locate the new hypervisor image data on the network and may issue a network request for the new hypervisor image data. In other embodiments, for example, the new hypervisor image data may be attached to the update hypervisor request 502. The receiving entity may then validate the hypervisor image data 508, using cryptographic techniques as described in connection with FIG. 1 and as would be apparent to one of ordinary skill in the art.

The receiving entity may then store the validated hypervisor image 510 as described in connection with FIG. 1. The storage of the hypervisor image may be a simple copy operation. In some other embodiments, the storage of the hypervisor image may require processing of the hypervisor image data in order to produce the hypervisor image as described in connection with FIG. 1 and with FIG. 4. The receiving entity may then instantiate a new hypervisor 512 as described in connection with FIG. 1. In some embodiments, the new hypervisor may be instantiated in a paused and empty state. The receiving entity may then instruct the existing hypervisor to pause all associated dependent domain 514 as described in connection with FIG. 1. After the associated dependent domains are paused, the receiving entity instructs the existing hypervisor to pause all non-essential system CPUs 516 such as, for example, any CPUs that are not running essential system processes. Essential system processes may include the existing hypervisor, the new hypervisor, the process scheduler, and/or a combination of these and any other such essential system processes, as described at least in connection with FIG. 1. The receiving entity may then instruct the new hypervisor to request state information, describing the hypervisor state, from the existing hypervisor 518 as described at least in connection with FIG. 1.

In some embodiments, the state information of the hypervisor may comprise one or more data structures that collectively fully describe the current state of a hypervisor. The state information may, for instance, contain information relating to the state of the hypervisor, the state of any client domains, the state of any virtualized hardware and/or one or more combinations of these and other state elements. The state of the hypervisor may include the operational state of any client domains, the operational state of the hypervisor itself, the execution queue of the client domains, the execution priority of the client domains and/or one or more combinations of these and other hypervisor state elements. In some embodiments, the state of a client domain may include the presence of any guest virtual machines running on that client domain, the type of operating system running on any virtual machines running on that client domain, the state of any virtual machines running on that client domain, and/or one or more combinations of these and other client domain state elements. The state of a virtual machine running on a client domain may include the state of the virtual machine process registers, the state of the virtual machine flags, the state of the virtual machine program counters, the state of the processes running on the virtual machine and/or one or more combinations of these and other virtual machine state elements.

In some embodiments, a paused client domain may include specifications and/or instructions on methods for resuming the paused client domain, including, but not limited to process entry points, process queues, pre-process directives, post-process directives and/or one or more combinations of these and other specifications and/or instructions on methods for resuming a paused client domain. The controlling domain instructs the existing hypervisor to serialize state information to an agreed-upon format, and in an agreed upon location and instruct the new hypervisor to serialize that state information from the agreed upon location. In some other embodiments, the new hypervisor instructs the existing hypervisor to send the state information directly to the new hypervisor, whereupon the new hypervisor may or may not need to translate the data into a new form. Once the new hypervisor has received the state information from the existing hypervisor, the receiving entity may then stop the existing hypervisor 520 and may then start the new hypervisor 522, both as described in connection with FIG. 1. The receiving entity may then resume all paused non-essential CPUs and resume all paused dependent domains 524 as described in connection with FIG. 1. Upon successful resumption of normal execution, the receiving domain may then complete any final operations 526, including, but not limited to, deleting the previous hypervisor, deleting the hypervisor image, reporting success, and/or some combination of these or similar operations, such as described in connection with FIG. 1.

Figure 6:
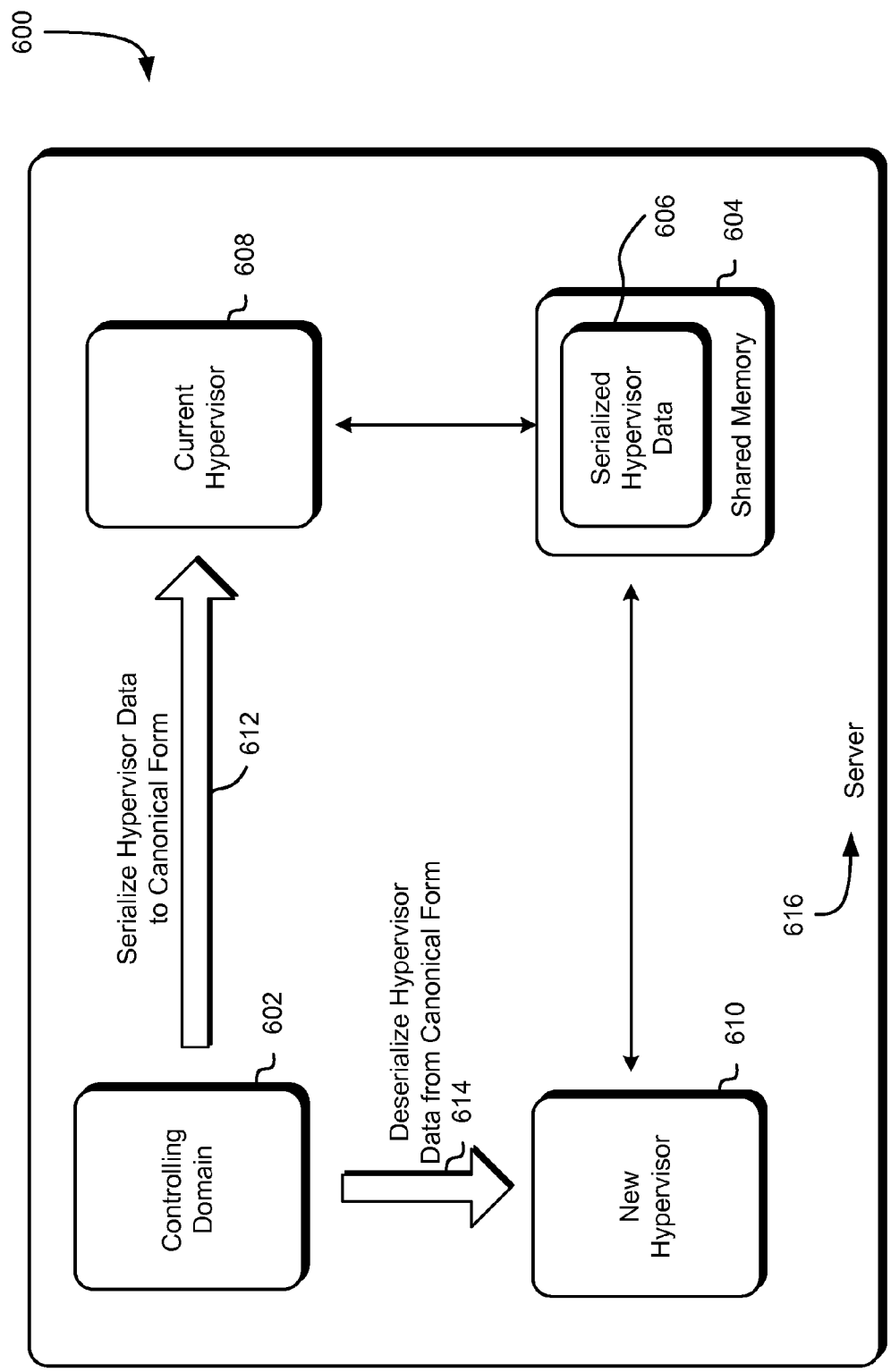
FIG. 6 illustrates an example implementation of a step from an example process for updating computing resources using processor-supported capabilities in accordance with at least one embodiment.

FIG. 6 illustrates an example implementation 600, of step 518 (to instruct new hypervisor to request data structures from existing hypervisor), of process 500, as detailed at least in conjunction with FIG. 5. In some embodiments, upon receiving the request to update hypervisor, completing any verification steps, pausing any client domains and pausing any system CPUs as described at least in conjunction with FIG. 4, the controlling domain 602 on server 616 may instruct 612 the current hypervisor 608 to serialize hypervisor data to an agreed-upon canonical (or common) form 606. The canonical form hypervisor data 606 may be stored in shared memory 604. In some embodiments, the serialized hypervisor data may be stored in an agreed-upon location within shared memory. In some other embodiments, the serialized hypervisor data may be stored in a location determined by the controlling domain. In some other embodiments, the current hypervisor 608 may choose the location and inform the controlling domain of that location. Once the data is stored, the controlling domain may then instruct 614 the new hypervisor 610 to de-serialize the hypervisor data from an agreed-upon canonical form 606. The location of the canonical form data will depend on the location chosen previously.

Figure 7:
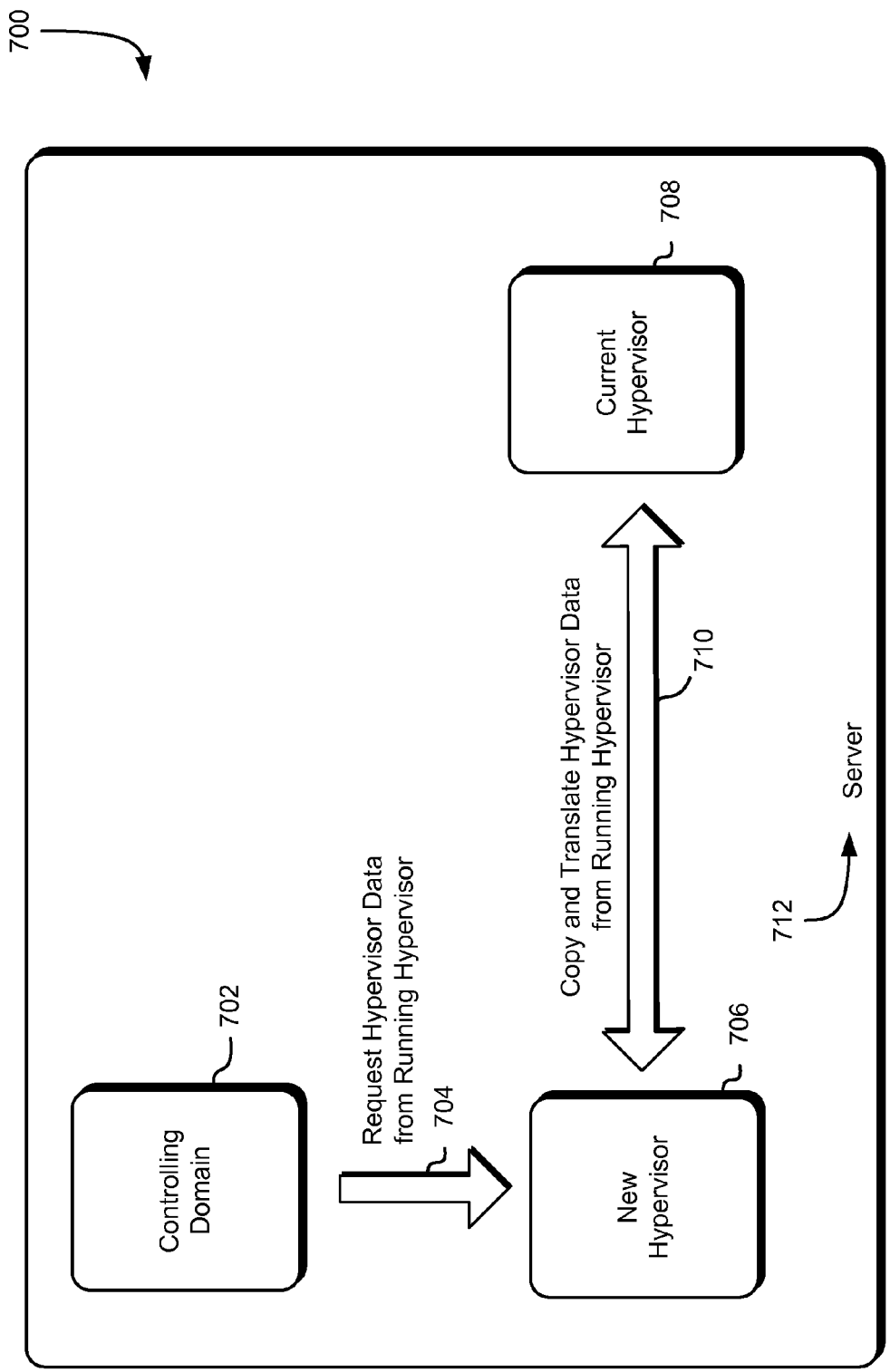
FIG. 7 illustrates an example implementation of a step from an example process for updating computing resources using processor-supported capabilities in accordance with at least one embodiment.

FIG. 7 illustrates an example implementation 700, a method to instruct the new hypervisor to request data structures from the existing hypervisor as described at least in conjunction with FIG. 5. In some embodiments, upon receiving the request to update hypervisor, completing any verification steps, pausing any client domains and pausing any system CPUs as described at least in conjunction with FIG. 4, the controlling domain 702 on server 712 may instruct 704, the new hypervisor 706, to request hypervisor data from the current hypervisor 708. Upon receiving the instruction, the new hypervisor may, in some embodiments, request 710 the hypervisor data from the current hypervisor 708. In some embodiments, the new hypervisor may be able to use the data from the current hypervisor directly, without any alteration. In some other embodiments, the new hypervisor may need to alter the data from the current hypervisor. In some embodiments, the data may be altered by adding data elements, removing data elements, altering data elements, and/or some combination of these and other methods.

Figure 8:
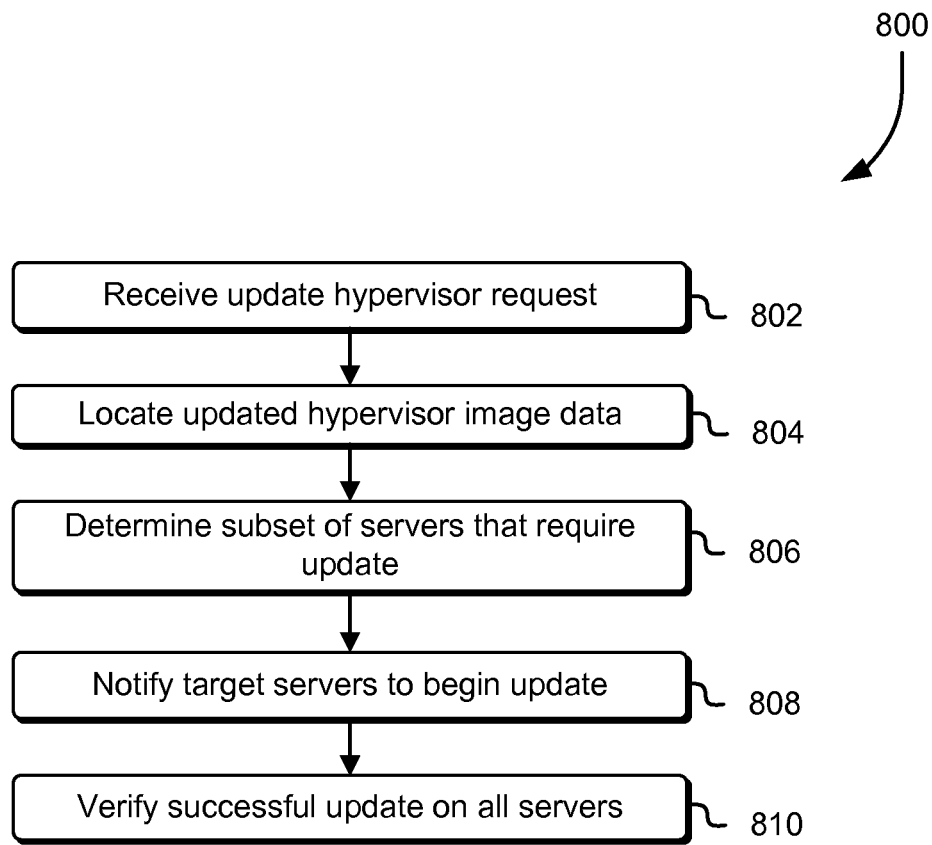
FIG. 8 illustrates an example process for updating computing resources in a plurality of systems in accordance with at least one embodiment.

FIG. 8 illustrates an example process 800 for updating one or more systems, servers or abstractions thereof within distributed computing systems and/or data centers. A request to update hypervisors is received 802 by an operational entity, such as the operator 202 described at least in connection with FIG. 2. The operational entity locates the updated hypervisor image data 804 as described at least in connection with FIGS. 1 and 2. The operational entity determines, based in some embodiments, on the nature of the request, the nature of the update image, and/or a combination of these or one or more other operational parameters as described at least in connection with FIG. 2, which subset of all available servers the update request should be sent to 806 as described at least in connection with FIGS. 1 and 2. Upon making the determination, the operational entity notifies the targeted entities to begin an update 808 as described at least in connection with FIGS. 1 and 2. Each targeted entity performs the update as described at least in connection with FIGS. 1 and 2. Upon completion of the update process, the operational entity verifies successful completion of the update 810 on all targeted entities, as described at least in connection with FIGS. 1 and 2.

As with all processes described herein, numerous variations of process 500 and process 800 are within the scope of the present disclosure. For example, in some embodiments, the authority of the operational entity to issue the update command to the targeted entities must be verified. Accordingly, variations of the present disclosure may include requesting authentication of this authority from an attached service and/or entity, an external service and/or entity, or some combination of these. Authentication requests may involve network communications, specialized passwords, public and private keys, attached devices, and/or any combination of these or of other authentication processes. In another example, in some embodiments, the new hypervisor may request state information from the existing hypervisor in order to duplicate the existing hypervisor's state. Accordingly, variations of the present disclosure may include variations on methods for facilitating this request. In some embodiments, a canonical data form may exist wherein both the existing and new hypervisors can both read and write the state information to an agreed-upon location. In these embodiments, the data may be read and written without translation by both the new and existing hypervisors. In some other embodiments, the existing hypervisor may have one form for the state information and the new hypervisor may have another, different form. In these embodiments, the state information, once written by the existing hypervisor, would then need to be translated into a new form by the new hypervisor. In some other embodiments, the new hypervisor may request the state information directly from the existing hypervisor, avoiding saving the state information to an agreed-upon location. In these embodiments, the new hypervisor may or may not need to translate the state information before using it.

As with other examples, various other hypervisor and controlling domain architectures are also considered as being within the scope of the present disclosure. For example, the above processes 500, 600, 700 and 800 as described at least in conjunction with FIG. 5 through FIG. 8 may be used with a single controlling domain, running on a single hypervisor that is a Type 1 (or bare metal) hypervisor running natively on system hardware, with one or more guest domains also associated with that hypervisor, as described in conjunction with FIG. 3 and FIG. 4. Generally, the techniques described and suggested herein also apply to updating hypervisors running in other configurations and/or architectures. In some embodiments, the hypervisor may be a Type 2 (or hosted) hypervisor running on the host operating system that is itself running on the system hardware. In some embodiments, there may be a plurality of hypervisors on a server, with these hypervisors being of Type 1, of Type 2, and/or of some combination of these or other types of hypervisors. In some embodiments, there may be a plurality of controlling domains on a server, each associated with one or more hypervisors. In some embodiments, these controlling domains, operating systems, and hypervisors may be nested in a variety of architectures and/or types.

Figure 9:
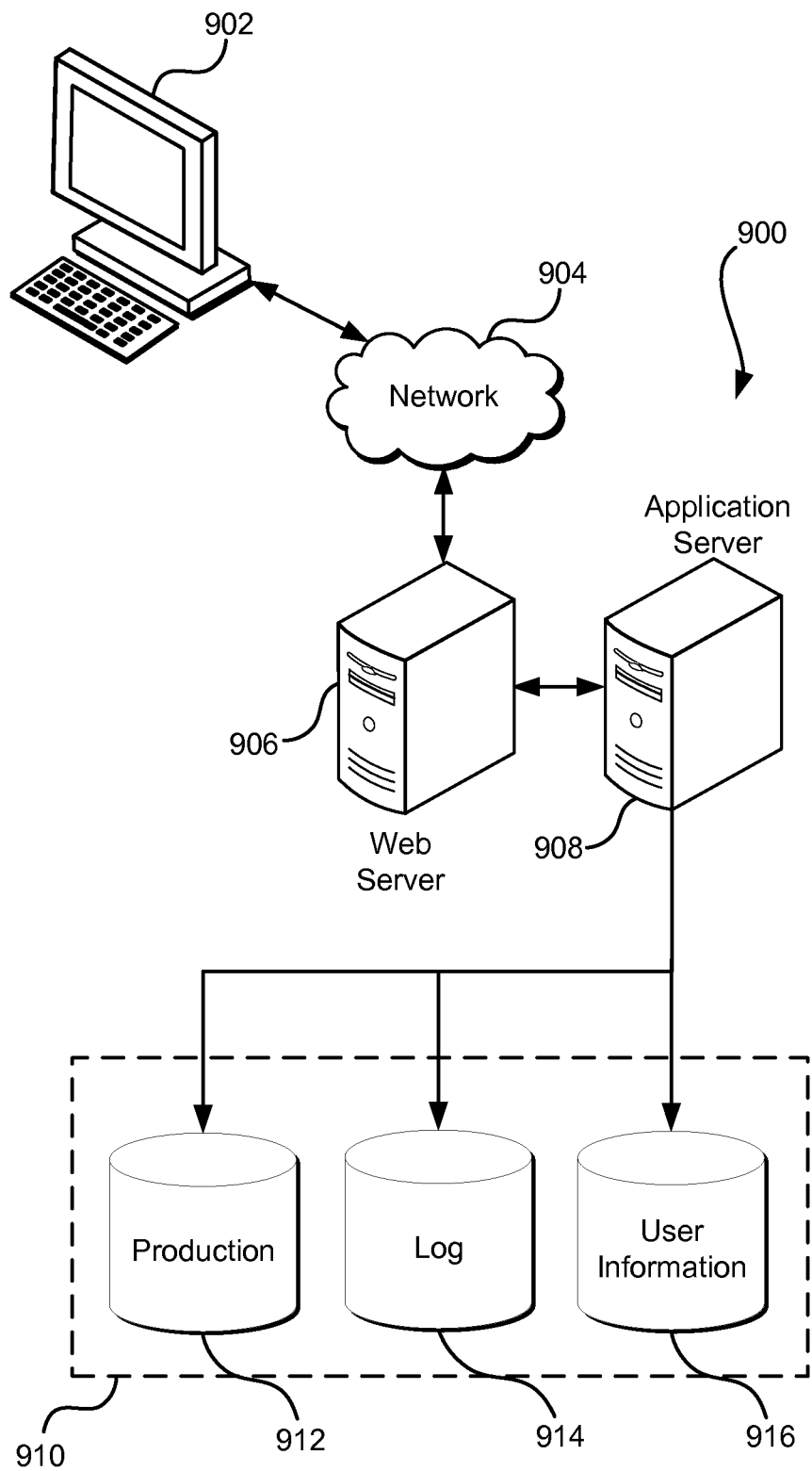
FIG. 9 illustrates an environment in which various embodiments can be implemented.

[FIG. 9 illustrates an example of an environment wherein embodiments can be practiced and this section has been reviewed in other applications such that you can skim this section if desired. Please keep in mind when reviewing the application that we want to cover aspects as they might apply in various situations, not just your implementation.]

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for performing an in-place hypervisor update comprising:
   receiving an update hypervisor request and an updated hypervisor image for the in-place hypervisor update at a computer system that utilizes a set of processors to implement a current hypervisor and one or more guest computer systems served by the current hypervisor; and
   processing the update hypervisor request by at least:
      pausing each guest computer system of the one or more guest computer systems;
      pausing one or more processors of the set of processors not performing the in-place hypervisor update;
      instantiating an updated hypervisor based at least in part on the update hypervisor image;
      instructing the updated hypervisor that has been instantiated based at least in part on the updated hypervisor image to obtain state information of the current hypervisor while each guest computer system of the one or more guest computer systems and the one or more processors not performing the in-place hypervisor update are paused, the state information containing information relating to an operational state of the current hypervisor, an operational state of the one or more quest computer systems, and a state of virtualized hardware;
      running, based at least in part on the obtained state information, the updated hypervisor in a state matching that of the current hypervisor, the updated hypervisor running while the current hypervisor is stored in a memory of the computer system;
      using a non-paused processor of the set of processors to:
         transfer operational control of the one or more guest computer systems from the current hypervisor to the updated hypervisor;
         resume execution of the paused one or more processors not performing the in-place hypervisor update; and
         resume execution of the one or more guest computer systems; and
      terminating the current hypervisor after the operational control is transferred and the updated hypervisor is instantiated.

2. The computer-implemented method of claim 1, wherein:
   prior to pausing each guest computer system of the one or more guest computer systems, processing the received update hypervisor request further comprises:
      verifying the updated hypervisor image
      validating the request for an in-place update to the computer system.

3. The computer-implemented method of claim 1, wherein:
   prior to obtaining state information of the current hypervisor while each guest computer system of the one or more guest computer systems and the one or more processors not performing the in-place hypervisor update are paused, processing the received update hypervisor request further comprises:
      verifying the one or more guest computer systems are paused; and
      verifying the one or more processors not performing the in-place update hypervisor are paused.

4. The computer-implemented method of claim 1, wherein:
   using the obtained state information to instantiate the updated hypervisor at least comprises:
      modifying the obtained state information from the current hypervisor to a canonical form;
      storing the state information in the canonical form; and
      providing the stored canonical form state information to the updated hypervisor.

5. The computer-implemented method of claim 1, wherein using the obtained state information to instantiate the updated hypervisor at least comprises copying the obtained state information from the current hypervisor directly into the state information of the updated hypervisor.

6. The computer-implemented method of claim 1, wherein:
   using the obtained state information to instantiate the updated hypervisor in a state matching the current hypervisor at least comprises:
      copying the state information from the current hypervisor into a temporary memory location;
      altering the state information copied from the current hypervisor to conform to the updated hypervisor; and copying the state information from the temporary memory location into the state information of the updated hypervisor.

7. A computer-implemented method for performing an in-place hypervisor update, comprising:
receiving an update hypervisor request for an in-place hypervisor update and an updated hypervisor image at a computer system that utilizes a set of processors to run an existing current hypervisor and one or more guest computer systems served by the existing current hypervisor;
validating an entity that issued the update hypervisor request;
at a time after receiving the update hypervisor request and the updated hypervisor image, at least sending a request to one or more controlling domains on the computer systems to pause one or more processors of the set of processors not performing the in-place hypervisor update and to pause execution of the one or more guest computer systems served by the existing current hypervisor;
at a time after pausing execution of the one or more guest computer systems, instantiating a new hypervisor based at least in part on the updated hypervisor image stored by the computer system;
instructing the new hypervisor that has been instantiated based at least in part on the updated hypervisor image to transfer, from the existing current hypervisor, state information from the existing current hypervisor to the new hypervisor while execution of the one or more guest computer systems is paused, the state information containing information relating to an operational state of the current hypervisor, an operational state of the one or more guest computer systems, and a state of virtualized hardware;
running, based at least in part on the transferred state information, the new hypervisor in a state matching that of the current hypervisor, the new hypervisor running while the existing current hypervisor is stored in memory of the computer system;
instructing the new hypervisor to transfer an operational control of the one or more guest computer systems from the existing current hypervisor to the new hypervisor;
terminating the existing current hypervisor after the operational control is transferred; and
resuming execution of the one or more processors of the set of processors not performing the in-place hypervisor update, and resuming the paused one or more guest computer systems under control of the new hypervisor on the computer system.

8. The computer-implemented method of claim 7, wherein the receiving the update hypervisor request includes a receiving process running on the one or more a controlling domains of the computer systems.

9. The computer-implemented method of claim 7, wherein the state information includes a copy of memory allocated to each of the one or more guest computing systems.

10. The computer-implemented method of claim 7, further comprising, at a time after pausing the one or more guest computer systems and before transferring the state information from the existing current hypervisor to the new hypervisor, verifying that the one or more guest computer systems that are paused.

11. The computer-implemented method of claim 7, wherein:

the method further comprises, at a time after pausing the one or more guest computer systems and before transferring the state information from the existing current hypervisor to the new hypervisor, pausing a proper subset of the set of processors on the one or more computer systems.

12. The computer-implemented method of claim 7, wherein at a time during which the new hypervisor is running, the current hypervisor is stored in a first set of memory locations in the memory of the computer system and the new hypervisor is stored in a second set of memory locations in the memory of the computer system different from the first set of memory locations.

13. A computer system for performing an in-place hypervisor update, comprising:
one or more processors; and
memory including executable instructions which, when executed by the one or more processors, cause the computer system to, in response to an update hypervisor request to perform the in-place hypervisor update of a current hypervisor by a controlling domain on the computer system, at least:
validate an entity that issued the update hypervisor request;
instantiate a new hypervisor based on new hypervisor image data stored by the computer system;
pause one or more guest computer systems served by the current hypervisor and one or more processors not performing the in-place hypervisor update;
obtain state information of the current hypervisor by the new hypervisor, the state information containing information relating to an operational state of the current hypervisor, an operational state of the one or more guest computer systems, and a state of virtualized hardware;
run, based at least in part on the obtained state information, the new hypervisor in a state matching that of the current hypervisor, the new hypervisor running while the current hypervisor is stored in the memory of the computer system;
instruct the new hypervisor to transfer an operational control of the one or more guest computer systems from the current hypervisor to the new hypervisor;
terminate the current hypervisor after the operational control is transferred;
resume execution of the one or more processors not performing the in-place hypervisor update; and
resume execution of the paused one or more guest computer systems under control of the new hypervisor on the computer system.

14. The computer system of claim 13, wherein pausing and resuming the one or more guest computer systems are performed by the current hypervisor.

15. The computer system of claim 13, wherein:
the executable instructions further cause the computer system to serialize the obtained state information to a canonical form usable by the new hypervisor; and
instantiate the new hypervisor is based at least in part on the serialized obtained state information in the canonical form.

16. The computer system of claim 13, wherein the executable instructions are performed by a host operating system of the computer system.

17. One or more non-transitory computer-readable storage media having collectively stored thereon executable instructions which, when executed by one or more processors of a computer system, cause the computer system to perform an in-place hypervisor update by at least performing operations to:

receive an update hypervisor request to update an active hypervisor in active operation on the computer system;

validate an entity that issued the update hypervisor request;

instantiate a new hypervisor based on a new hypervisor image data stored by the computer system;

at a time after receiving the update hypervisor request and instantiating the new hypervisor:

cause one or more controlling domains on the computer system to pause execution of one or more guest computer systems, supported by the active hypervisor in active operation, and the one or more processors not performing the in-place hypervisor update;

at a time after execution of the one or more guest computer systems are paused, instruct the new hypervisor to transfer state information, the state information containing information relating to an operational state of the active hypervisor, an operational state of the one or more guest computer systems, and a state of virtualized hardware;

run, based at least in part on the transferred state information, the new hypervisor in a state matching that of the active hypervisor, the new hypervisor running while the active hypervisor is stored in memory of the computer system;

terminate the active hypervisor after an operational control of the one or more guest computer systems is transferred from the active hypervisor to the new hypervisor; and at a time after transferring the state information from the active hypervisor to the new hypervisor, resume execution of the one or more processors not performing the in-place hypervisor update, and to resume execution of the one or more guest computer systems under control of the new hypervisor.

18. The one or more non-transitory computer-readable storage media of claim 17, wherein transferring the state information includes the new hypervisor modifying state information of the active hypervisor to a form usable by the new hypervisor.

19. The one or more non-transitory computer-readable storage media of claim 17, wherein for each guest computer system of the one or more guest computer systems:

the active hypervisor allocates physical memory of the computer system to the guest computer system; and the allocated physical memory remains allocated to the guest computer system after resuming execution of the guest computer system.

20. The one or more non-transitory computer-readable storage media of claim 17, wherein for each guest computer system of the one or more guest computer systems:

the guest computer system is in a particular state when execution of the guest computer system is paused; and resuming execution of the one or more guest computer systems includes resuming the guest computer system from a particular state.

21. The one or more non-transitory computer-readable storage media of claim 17, wherein transferring the state information to the new hypervisor includes copying the state information from the active hypervisor to the new hypervisor.

22. The one or more non-transitory computer-readable storage media of claim 17, wherein transferring the state information to the new hypervisor includes modifying a form of the state information from the active hypervisor to a canonical form and providing the state information in the canonical form to the new hypervisor.

\* \* \* \* \*